J. R. WRIGHT.
PNEUMATIC GRAIN ELEVATOR.
APPLICATION FILED MAR. 31, 1917.
1,236,032.
Patented Aug. 7, 1917.
3 SHEETS—SHEET 3.
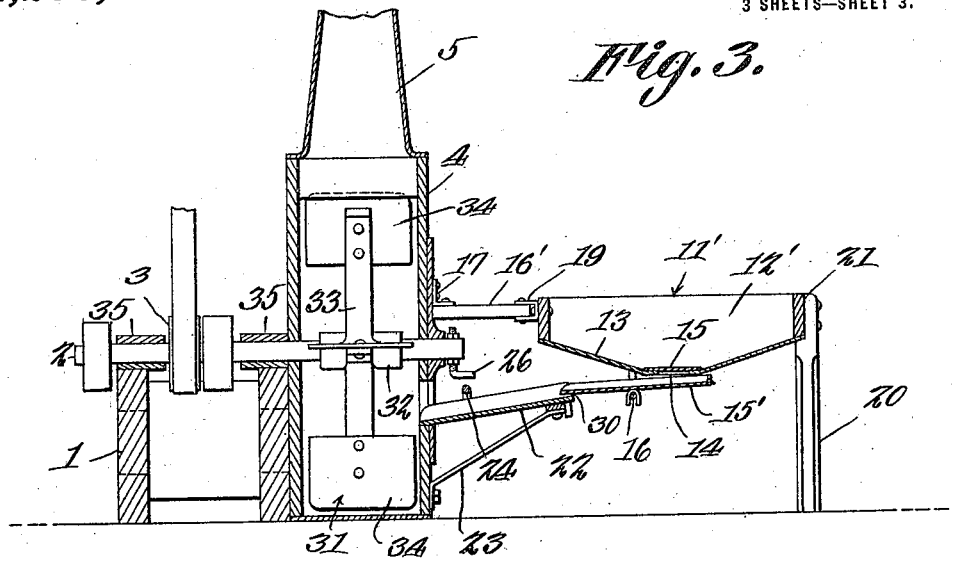
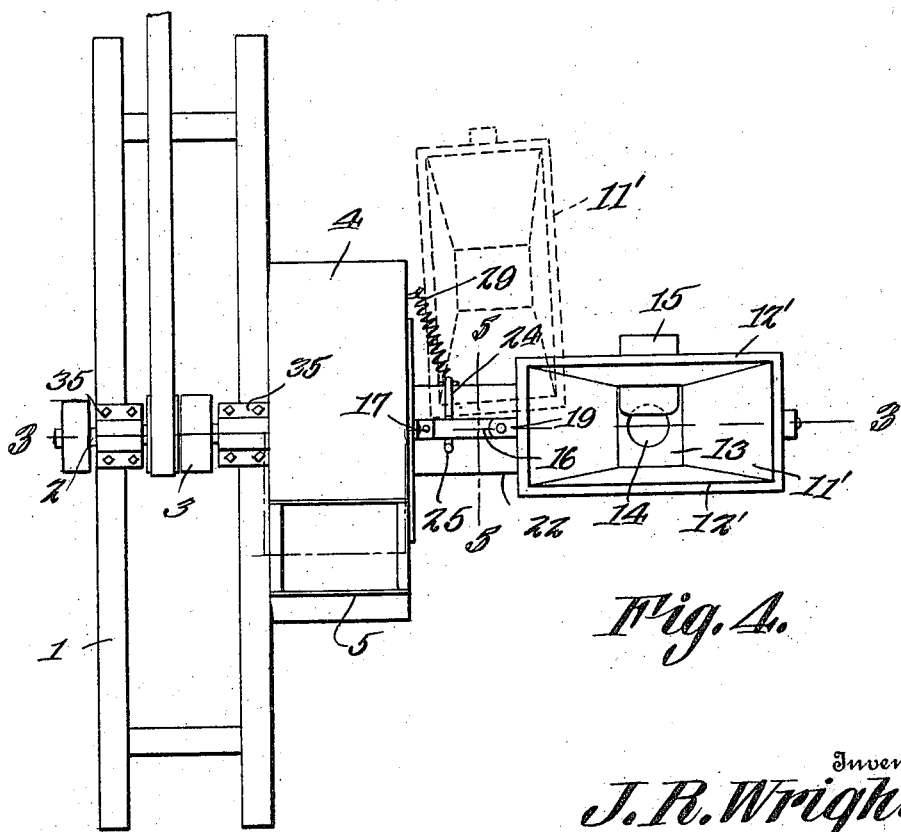
Inventor
J. R. Wright
By C. A. Snow & Co.
Attorneys.

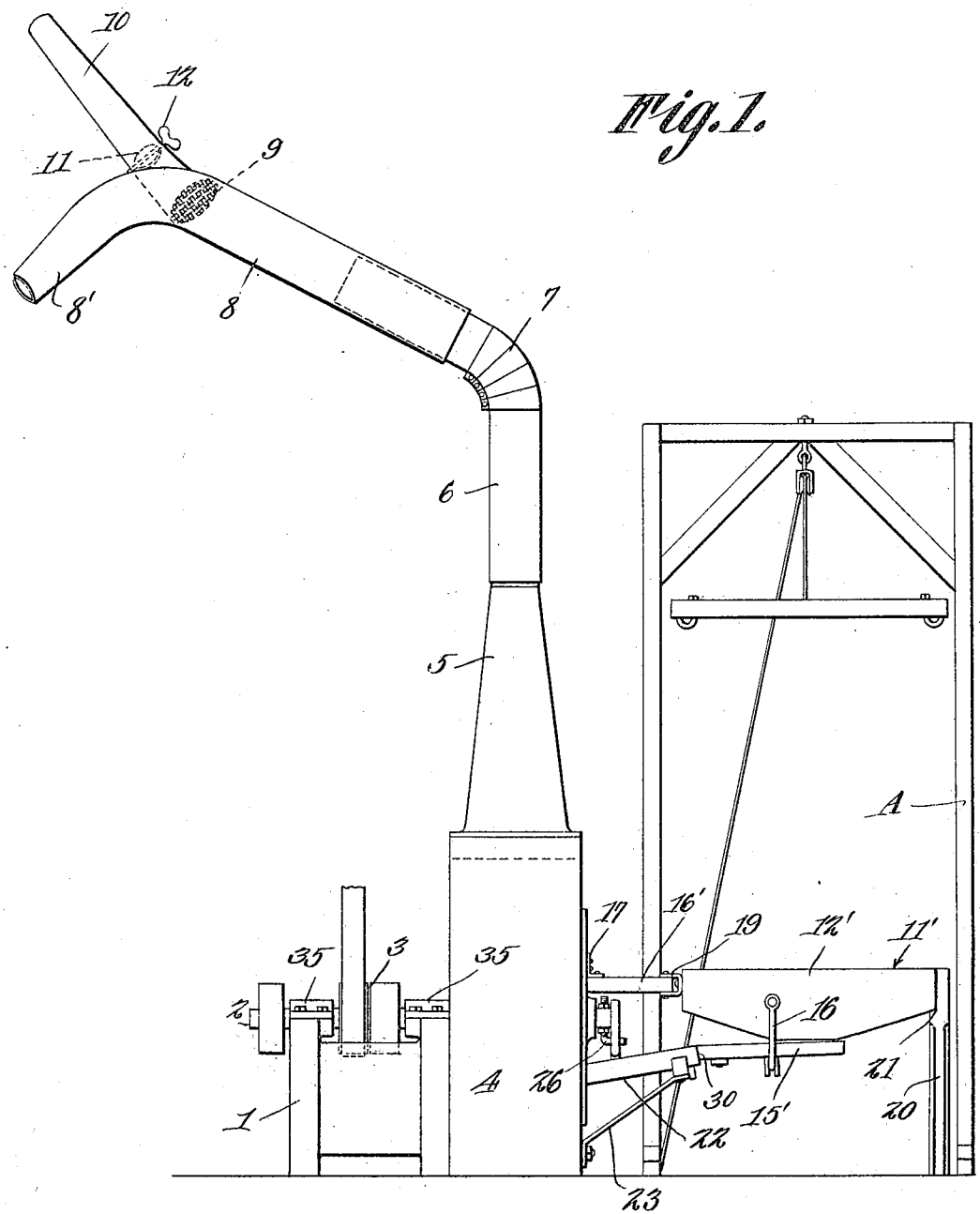

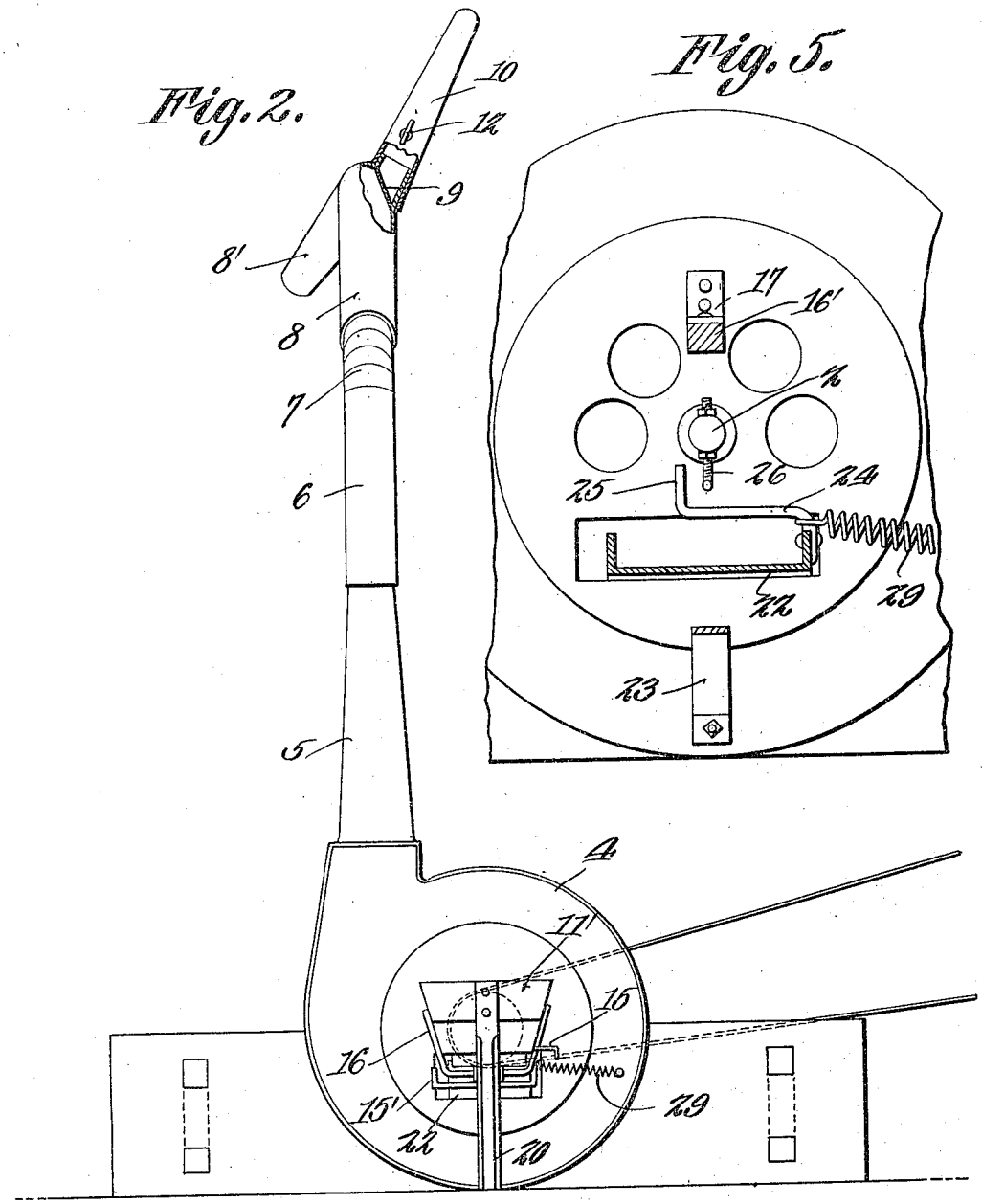

United States Patent Office.

JOHN R. WRIGHT, OF WHEELING, MISSOURI, ASSIGNOR OF TWO-FIFTHS TO JOHN O. BRIGMAN, OF WHEELING, MISSOURI.

PNEUMATIC GRAIN-ELEVATOR.

1,236,032.    Specification of Letters Patent.    Patented Aug. 7, 1917.

Application filed March 31, 1917. Serial No. 158,898.

*To all whom it may concern:*

Be it known that I, JOHN R. WRIGHT, a citizen of the United States, residing at Wheeling, in the county of Livingston and State of Missouri, have invented a new and useful Pneumatic Grain-Elevator, of which the following is a specification.

This invention is an improvement in grain loading apparatus, and contemplates in the first instance, the transportation of grain or other matter by means of air pressure, thus eliminating cumbersome apparatus used heretofore involving multiple handling and numerous mechanical contrivances.

A second, though none the less important object, is to adapt the apparatus used in transportation for the further use of cleansing grain, polishing it and removing deleterious, extraneous matter.

A coördinate object is to provide a readily movable and adjustable device for adaptation to angular paths of load travel, thus dispensing with the inconvenience involved in unloading and loading to reach a substantially permanent destination.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings:

Figure 1 is an assembly view of my invention, as the same appears when its respective parts are placed in an operative position with reference to each other;

Fig. 2 is a detail side elevation of my invention showing particularly the construction of the shaker pan;

Fig. 3 is a view on the line 3—3 of Fig. 4;

Fig. 4 is a plan view;

Fig. 5 is a view on the line 5—5 of Fig. 4.

Referring to the drawings wherein has been illustrated the application of the invention in a general way, the numeral 1 designates a drive mechanism of any desired type, the shaft 2 of which is provided with drive wheels 3 for actuation of the same. Said shaft extends within a fan casing 4 to operate a fan 31 contained therein for the purpose of creating an air blast in the conveyer pipe or tube 5 which is composed of telescoping sections enabling one to take the same apart for storage or transportion. Intermediate said sections is mounted a flexible joint 7 for substantially universal movement to facilitate the conveying of material to different destinations.

The terminal section 8 is forked to provide a slightly reduced discharge nozzle portion 8', and a detachable air exhaust tube 10 which is screened as at 9 to deflect particles of grain tending to enter the same. The air exhaust tube 10 is provided midway its terminals with a damper 11 provided with a handle 12 for moving the same when it is desired to regulate the exhaust of air during operation of the invention.

In order to facilitate unloading a vehicle or other carrier, (not shown) a derrick A, which forms no part of my invention, is provided, and may be of any desired type. Adjacent to said derrick A is a receiving hopper 11', the construction of which will be more specifically outlined hereinafter. Through the medium of the derrick A the vehicle or other container is elevated to readily discharge grain into the hopper 11'. The said hopper 11' has its sides 12' inclined inwardly approaching the bottom 13, which is provided with an opening 14 having a sliding closure 15 movable within a slot in the side of the hopper to allow egress of the grain into the inclined chute 15' movably supported beneath said opening by bail 16 which is pivotally engaged to the bottom of the chute. After the vehicle has been unloaded, the said hopper 11' may be moved from its operative position to the position of rest as shown by the dotted lines in Fig. 4. In order to accomplish this result, a transverse support 16' is provided which is rigidly secured by means of brackets 17 to the fan casing. The said support is pivotally engaged at its free extremity by a bifurcated bracket 19 rigidly carried by the said hopper. To support the hopper when in operative position, I have mounted a post 20 having a lateral cutaway portion 21, upon which is seated the free end of the hopper in the manner adequately shown in Fig. 3.

Oftentimes during the process of unloading a device of this character, the grain is apt to clog the chute. In order to eliminate this disadvantage, there is provided an inclined reciprocating shaker pan generally designated by the numeral 22, which is mounted for reciprocation upon the arm 23 rigidly carried by the fan casing 4 in the manner illustrated in Fig. 3. Mounted upon one of the sides of the said shaker pan is a transverse arm 24 provided with an upstanding finger 25 adapted for periodical engagement with an adjustable tappet 26 mounted upon the end of the drive shaft 2 of the fan. Upon actuation of the said fan the shaft is revolved, and the tappet 26 engages the finger 25, which in turn imparts movement to the pan.

Upon disengagement of the tappet 26 and finger 25, the pan is returned to its normal position by action of the coil spring 29 mounted on the fan casing and secured to the transverse arm as is clearly illustrated in Fig. 5. The reciprocating movement of the shaker pan is imparted to the chute 15 through supporting engagement as illustrated at 30 in Fig. 3.

The fan 31 comprises a hub 32 having spokes 33 to which are riveted or otherwise secured blades 34 preferably rectangular, but which may be of any desired configuration. The said hub is keyed to the shaft 2 which is supported within bearings 35 carried adjacent the fan casing. Upon revolution of the fan, a strong air blast is created, and the grain particles are drawn within the casing and discharged through the conveyer tube. The rapid rotation of the grain particles causes them to become shiny and clean through engagement with each other and the walls of the casing and tube and the surface of the fan. As the grains pass the exhaust port, the deleterious, extraneous matter is separated from them through the screen 9, and the grain is discharged in a thoroughly cleansed condition from the nozzle 8'.

What is claimed is:—

1. A grain elevator, comprising a conveyer tube, a fan casing at one end of the tube, a fan shaft journaled in and extending through the casing, a tappet on the fan shaft, a delivery spout entering the casing, an arm secured to the spout and provided with an upstanding finger adapted to be struck by the tappet, and means for delivering material to the delivery spout.

2. A grain elevator, comprising a conveyer casing, a shaft journaled in and extending beyond the casing, a tappet on the shaft, a delivery spout communicating with the casing, an arm on the spout and overlying the same, a finger upstanding from the arm and in the path of the tappet, and a resilient element for oscillating the spout under action of the tappet.

In testimony that I claim the foregoing as my own, I have hereto affixed my signature in the presence of two witnesses.

JOHN R. WRIGHT.

Witnesses:
W. F. BOWEN,
LUTHER BOONE.